E. A. STRAND.
STEAM FRICTION DEVICE.
APPLICATION FILED SEPT. 25, 1913.
1,113,711.
Patented Oct. 13, 1914.
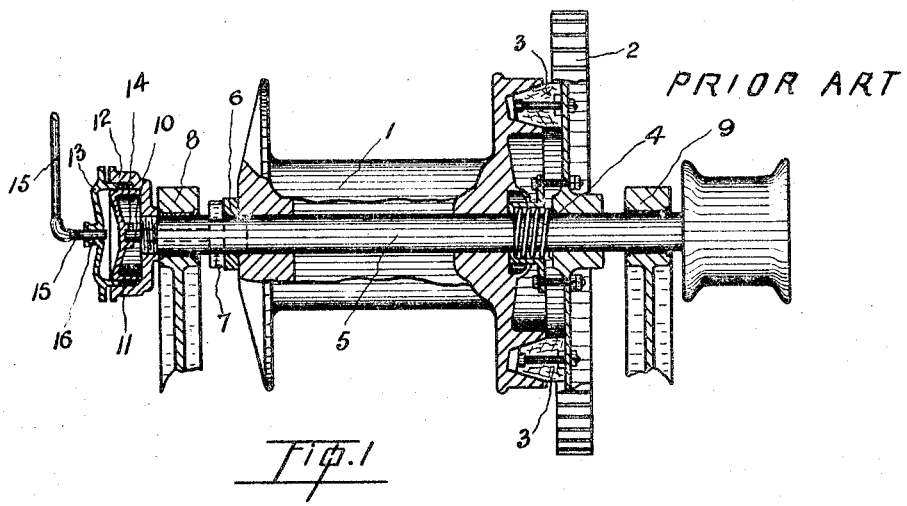
Fig. 1 — PRIOR ART
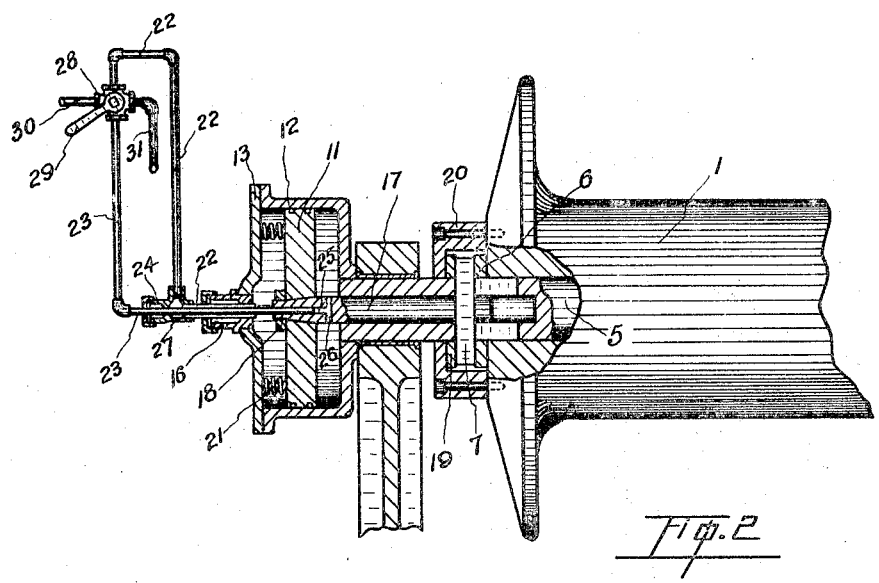
Fig. 2
WITNESSES.
Elizabeth Taylor.
B. F. Buxter.
INVENTOR.
ERIC A. STRAND.
BY Fetherstonhaugh & Co.
ATT'YS.

UNITED STATES PATENT OFFICE.

ERIC ALFRED STRAND, OF VANCOUVER, BRITISH COLUMBIA, CANADA.

STEAM FRICTION DEVICE.

1,113,711. Specification of Letters Patent. Patented Oct. 13, 1914.

Application filed September 25, 1913. Serial No. 791,786.

*To all whom it may concern:*

Be it known that I, ERIC ALFRED STRAND, a citizen of the United States, residing at the city of Vancouver, in the Province of British Columbia, Canada, have invented certain new and useful Improvements in Steam Friction Devices, of which the following is a specification.

My invention relates to improvements in steam friction devices, with more particular reference to those used for engaging the drums of drum engines, such as hoisting and haulage engines, on to the friction blocks, and the object of my invention is to devise a steam friction in which it is possible to apply steam pressure to both sides of the piston alternately, thus making it possible to engage or release the drum on and off the friction blocks by steam, with equal facility, instead of, as at the present time, engaging the drum by steam and then depending on spring means for effecting its release. I attain this object by means of the construction illustrated in the accompanying drawings, in which—

Figure 1 is a longitudinal elevation, in part section, showing the drum and steam friction device, as in use at the present time. Fig. 2 is an enlarged view of the drum end and shaft, showing my steam friction device adapted thereto.

Similar figures of reference indicate similar parts throughout the several views.

1 represents the drum of a typical drum engine.

2 is the driving gear.

3 are the friction blocks.

4 is the drum spring.

5 is the drum shaft.

6 is the drum collar.

7 is the cross key.

8 and 9 are the main bearings.

10 is the friction pin.

11 is the steam friction piston.

12 is the steam friction cylinder.

13 is the cylinder head.

14 is the piston bushing.

15 is the steam pipe.

16 is the steam pipe stuffing box.

Referring now to Fig. 1, which illustrates the present mode of engaging the drum 1 by steam means and of releasing it by spring means, it will be seen that the action is as follows: When it is desired to engage the drum 1 on to the friction blocks 3 the steam is turned into the cylinder 12 through the steam pipe 15 to exert a pressure on the outer surface of the piston 11, and this pressure is transmitted by means of the friction pin 10 and cross key 7 to the drum collar 6, which bears against the end of the drum, and thus the drum is forced against the spring 4 and on to the friction blocks 3, the spring 4 remaining in compression until the drum is released. When it is desired to release the drum from the friction blocks to allow it to run free, the pressure on the outer end of the drum is relieved by allowing the steam to exhaust out of the cylinder 12, whereupon the drum spring 4 expands and forces the drum off the friction blocks 3. In practice, however, it is found that while the steam means for engaging the drum is efficient, the spring means for releasing it is not quite so effective, since the effective release of the drum depends on the efficiency of the springs. Consequently it frequently happens that the drum remains fast on the friction blocks, when it is intended to be released therefrom, due to the failure of the spring to work properly. It is preferable, therefore, to use a drum releasing device similar to that shown in Fig. 2, as more particularly hereinafter described, and in order that this device should be workable by steam, to either engage or release the drum with equal facility, it is necessary to be able to apply the steam pressure alternately to both sides of the piston connected to the device. This I am able to do by means of the construction illustrated in Fig. 2, to which particular attention is now drawn and in which—

17 is the friction pin.

18 is the piston nut.

19 is the cross key collar.

20 is a casing attached to the drum end and inclosing the cross key 7 and the collars 6 and 19.

21 are the piston springs.

22 is the steam pipe for the front of the piston.

23 is the steam pipe for the back of the piston.

24 is the stuffing box for the steam pipe 23.

25 is an annular bore extending inwardly into the body of the friction pin 17.

26 is a transverse bore through the friction pin 17 and in connection with the bore 25 to provide an outlet therefor.

27 is a T connection adapted for the suitable arrangement of the steam pipes 22 and 23.

28 is a four way steam valve.
29 is the handle therefor.
30 is the main steam supply pipe.
31 is the main exhaust pipe.

Still referring particularly to Fig. 2, it will be seen that any forward movement of the friction pin 17 will cause the cross key 7 to bear on the drum collar 6 and thus force the drum 1 on to the friction blocks 3, while the reverse movement will cause the cross key 7 to bear on the collar 19 to exert a pull on the casing 20, thus pulling the drum 1 off the friction blocks 3, and effectively releasing it therefrom. Therefore, if the piston 11 be permanently secured to the friction pin, instead of being loose thereon, as in Fig. 1, and steam be turned in to the cylinder 12 to exert a pressure on the front and back of the piston alternately as required, the results above mentioned will be attained.

The manner, therefore, in which my steam friction device is assembled and operated is as follows: The piston 11 is fitted on to the outer end of the friction pin, and secured thereto by the nut 18 or any other approved mechanical means. The annular bore 25 and transverse bore 26 connecting therewith are provided so that there will be a passage through from the outside to the space behind the piston when the piston is in place. After the piston has been fitted to the friction pin and assembled, the cover 13 may be put on, and the steam pipes connected up as shown in Fig. 2, that is, the pipe 22 makes a connection through the stuffing box 16, to the space in front of the piston from the valve 28, while the pipe 23 makes a similar connection through the stuffing box 24, the T 27, the pipe 22, the annular bore 25, and the transverse bore 26 with the space behind the piston. If now it is desired to engage the drum on to the friction blocks, the plug in the valve 28 is moved so that the ports therein will admit live steam through the pipe 22 to the space in front of the piston, while the other ports in the plug of the valve will be open to the space behind the piston and the exhaust pipe 31, thus permitting the exhaust of any steam behind the piston through the pipe 23. If it is desired to release the drum from the friction blocks, the action described in the foregoing is reversed, that is, the plug in the valve 28 is moved so that the ports therein will admit live steam through the pipe 23 and the bores 25 and 26 into the space behind the piston, while the other ports will be open to the space in front of the piston and the exhaust pipe 31, thus allowing the steam therein to be exhausted. By this means the steam pressure is exerted on the front and back of the piston alternately, to effect the engagement or release of the drum, as described.

It will be seen, therefore, that I have devised a steam friction device, adaptable to the drums of drum engines and the like, in which it is possible to apply steam pressure on both sides of the piston alternately, thus making it possible to either engage or release the drum on to or from the friction blocks, by the use of steam in both cases, instead of, as at the present time, engaging the drum by steam and then having to depend on spring means for effecting its release.

What I claim as my invention is—

In a clutch actuating device, the combination with a main supporting shaft having an axial bore in one end thereof and a drum loosely mounted upon the shaft, of a pin slidably held in the bore, connecting means between the inner end of the pin and the drum, a piston mounted upon the outer end of the pin, a cylinder in which the piston operates, a duct extending longitudinally through the pin from the outer end thereof and leading into the cylinder at the opposite side of the piston, a stationary duct leading into the outer end of the cylinder, an inner steam duct leading through the aforesaid steam duct into the duct of the pin, means for feeding steam in the said ducts, means for exhausting steam therefrom and a controlling valve designed to alternately open the alternate ducts to the steam inlet and exhaust, as and for the purpose specified.

Dated at Vancouver, B. C., this 5th day of September, 1913.

ERIC ALFRED STRAND.

Witnesses:
JAMES TAYLOR,
FREDERICK GEORGE TANNER LUCAS.